(12) United States Patent
Craft, Jr.

(10) Patent No.: US 12,107,429 B2
(45) Date of Patent: Oct. 1, 2024

(54) POWER BOOST FOR POWER AND DATA CONNECTIVITY MICRO GRIDS FOR INFORMATION AND COMMUNICATION TECHNOLOGY INFRASTRUCTURE AND RELATED METHODS AND DEVICES

(71) Applicant: Outdoor Wireless Networks LLC, Claremont, NC (US)

(72) Inventor: Thomas F. Craft, Jr., Murphy, TX (US)

(73) Assignee: Outdoor Wireless Networks LLC, Claremont, NC (US)

( * ) Notice: Subject to any disclaimer, the term of this patent is extended or adjusted under 35 U.S.C. 154(b) by 333 days.

(21) Appl. No.: 17/380,866

(22) Filed: Jul. 20, 2021

(65) Prior Publication Data
US 2022/0102946 A1 Mar. 31, 2022

Related U.S. Application Data

(60) Provisional application No. 63/083,572, filed on Sep. 25, 2020.

(51) Int. Cl.
*H02B 1/26* (2006.01)
*H02B 1/20* (2006.01)
(Continued)

(52) U.S. Cl.
CPC .................. *H02J 4/00* (2013.01); *H04B 3/54* (2013.01); *H02G 3/08* (2013.01); *H02G 15/02* (2013.01);
(Continued)

(58) Field of Classification Search
CPC .......... G06F 1/189; G06F 1/263; G06F 1/266; H02G 15/02; H02G 3/08; H02J 1/00;
(Continued)

(56) References Cited

U.S. PATENT DOCUMENTS 10,833,529 B2 11/2020 Kurk et al.
11,139,683 B2 10/2021 Kurk et al.
(Continued)

FOREIGN PATENT DOCUMENTS

WO 2018017544 A1 1/2018

OTHER PUBLICATIONS

"International Search Report and Written Opinion of the International Searching Authority", International Application No. PCT/US2021/042387, Oct. 18, 2021, 14 pp.

*Primary Examiner* — David S Huang
(74) *Attorney, Agent, or Firm* — Myers Bigel, P.A.

(57) ABSTRACT

A power and data connectivity micro grid for Information and Communication Technologies (ICT) infrastructure includes power sourcing equipment device configured to deliver a first direct current (DC) power signal to a power port of the power sourcing equipment device, a power boost module having a power input port and a power output port, where the power boost module is configured to add a DC boost power signal to a second DC power signal received at the power boost module, a first splice enclosure, a second splice enclosure, and first, second and third composite power-data cables configured to transmit first, second, and third DC power signals. The third DC power signal from the power output port of the power boost module includes the DC boost power signal added to the second DC power signal that was received at the power input port of the power boost module.

10 Claims, 11 Drawing Sheets

(51) Int. Cl.
  *H02J 4/00* (2006.01)
  *H04B 3/54* (2006.01)
  *H04L 12/10* (2006.01)
  *H02G 3/08* (2006.01)
  *H02G 15/02* (2006.01)
  *H02J 1/00* (2006.01)

(52) U.S. Cl.
  CPC ............. *H02J 1/00* (2013.01); *H02J 2310/16* (2020.01); *H04L 12/10* (2013.01)

(58) Field of Classification Search
  CPC ......... H02J 2310/16; H02J 4/00; H04L 12/10; H04B 3/54
  See application file for complete search history.

(56) References Cited

U.S. PATENT DOCUMENTS

| | | | |
|---|---|---|---|
| 2017/0026188 A1* | 1/2017 | Herzel | ............. G06F 1/30 |
| 2017/0185125 A1 | 6/2017 | Lin | |
| 2017/0187469 A1 | 6/2017 | Sipes | |
| 2019/0280895 A1* | 9/2019 | Mather | ............. H04L 41/12 |
| 2020/0027629 A1 | 1/2020 | Craft et al. | |

\* cited by examiner

POWER BOOST FOR POWER AND DATA CONNECTIVITY MICRO GRIDS FOR INFORMATION AND COMMUNICATION TECHNOLOGY INFRASTRUCTURE AND RELATED METHODS AND DEVICES

CROSS-REFERENCE TO RELATED APPLICATION

The present application claims priority to U.S. Provisional Patent Application Ser. No. 63/083,572, filed Sep. 25, 2020, the entire content of which is incorporated herein by reference.

FIELD

The present invention relates to information and communication technology systems and, more particularly, to providing electric power and data connectivity to remote devices in such systems.

BACKGROUND

In many information and communication technology systems, network-connected electronic devices are deployed in locations where a local electric power source is not available. With the proliferation of the Internet of Things ("IoT"), autonomous driving, fifth generation ("5G") cellular service and the like, it is anticipated that network-connected electronic devices will be deployed at locations that lack a conventional electric power source with increasing frequency.

There are a number of ways to provide electric power to such remote network-connected electronic devices. For example, the local electric utility company can install a connection to the electric power grid. This approach, however, is typically both expensive and time-consuming, and unsuitable for many applications. Composite power-data cables can also be used to power remote network-connected electronic devices and provide data connectivity thereto over a single cabling connection. Composite power-data cables refer to cables that can transmit both electrical power and data. Power-over Ethernet ("PoE") cables are one type of composite power-data cable. However, PoE technology has limitations in terms of both data communication throughput and the amount of power delivered, and these limitations become more restrictive the greater the distance between the remote network-connected electronic device and the PoE source. For example, under current PoE standards, high throughput data communications is only supported for cable lengths of up to about 100 meters, and even at these short distances the power delivery capacity is only about 100 Watts. Power-plus fiber cables are another example of a type of composite power-data cable that includes both power conductors and optical fibers within a common cable jacket. Other known types of composite power-data cables include coaxial cables, telephone twisted pair cables with remote power feeding on some pairs and direct subscriber line (DSL) data on other pairs or with both power and DSL on the same pairs, and composite cables having larger conductors (e.g., 10-12 AWG) for power transmission and smaller gauge twisted pairs for data transmission.

SUMMARY

Various embodiments of the present inventive concepts include a power and data connectivity micro grid for Information and Communication Technologies (ICT) infrastructure, including a power sourcing equipment device configured to deliver a first direct current (DC) power signal to a power port of the power sourcing equipment device, and a power boost module having a power input port and a power output port. The power boost module is configured to add a DC boost power signal to a second DC power signal received at the power input port of the power boost module. The power and data connectivity micro grid includes a first splice enclosure having a power input port, a power tap port, and a power output port, and second splice enclosure having a power input port, a power tap port, and a power output port. The power and data connectivity micro grid includes a first composite power-data cable configured to transmit the first DC power signal from the power port of the power sourcing equipment device to the power input port of the first splice enclosure, a second composite power-data cable configured to transmit the second DC power signal from the power output port of the first splice enclosure to the power input port of the power boost module, and a third composite power-data cable configured to transmit a third DC power signal from the power output port of the power boost module to the power input port of the second splice enclosure. The third DC power signal from the power output port of the power boost module comprises the DC boost power signal added to the second DC power signal that was received at the power input port of the power boost module.

According to some embodiments, an exit DC voltage of the first DC power signal at the power input port of the first splice enclosure may be less than an entry voltage of the first DC power signal at the power port of the power sourcing equipment device. The DC boost power signal added to the second DC power signal received at the power input port of the power boost module results in an entry voltage of the third DC power signal at the third composite power-data cable that may be greater than the an exit DC voltage of the second DC power signal that was received at the power input port of the power boost module. The power boost module may include a rechargeable battery unit that is configured to generate the DC boost power signal. The rechargeable battery unit may be charged during periods of low power usage by the power and data connectivity micro grid. The power boost module may include an alternating current (AC) unit that is configured to convert AC power to the DC boost power signal in some embodiments.

Various embodiments of the present inventive concepts may include a method of boosting power in a power and data connectivity micro grid for Information and Communication Technologies (ICT) infrastructure. The method includes delivering a first direct current (DC) power signal to a power port of the power sourcing equipment device, transmitting the first DC power signal from the power port of the power sourcing equipment device to a power input port of a first splice enclosure on a first composite power-data cable, transmitting a second DC power signal from a power output port of the first splice enclosure to a power input port of a power boost module on a second composite power-data cable, adding a DC boost power signal to the second DC power signal received at the power input port of the power boost module to generate a third DC power signal, and transmitting the third DC power signal from a power output port of the power boost module to a power input port of a second splice enclosure on a third composite power-data cable.

According to some embodiments, an exit DC voltage of the first DC power signal at the power input port of the first splice enclosure may be less than an entry voltage of the first DC power signal at the power port of the power sourcing equipment device. The DC boost power signal added to the second DC power signal received at the power input port of the power boost module results in an entry voltage of the third DC power signal at the third composite power-data cable that may be greater than the an exit DC voltage of the second DC power signal that was received at the power input port of the power boost module. The DC boost power signal may be generated by a rechargeable battery unit. The rechargeable battery unit may be charged during periods of low power usage by the power and data connectivity micro grid. The method may include receiving an alternating current (AC) power signal, and converting the AC power signal to the DC boost power signal.

Various embodiments of the present inventive concepts include a power boost device for Information and Communication Technologies (ICT) infrastructure that includes a power input port, a power output port, a direct current (DC) boost power generator configured to generate a DC boost power signal, a power addition module configured to add the DC boost power signal to an input DC power signal received at the power input port to generate an output DC power signal, and a power transmitter configured to transmit the output DC power signal on the power output port.

According to some embodiments, the power input port may be coupled to a first composite power-data cable on which the input DC power signal is received. The power output port may be coupled to a second composite power-data cable on which the output DC power signal is transmitted. An output DC voltage of the output DC power signal may be greater than an input DC voltage of the input DC power signal received at the power input port. The power boost device may include a rechargeable battery unit that is configured to generate the DC boost power signal. The rechargeable battery unit is charged during periods of low power usage in a power and data connectivity micro grid that includes the power boost device. The power boost device may include an alternating current (AC) unit that is configured to receive an AC power signal and convert the AC power signal to the DC boost power signal in some embodiments.

DETAILED DESCRIPTION

Figure 1:
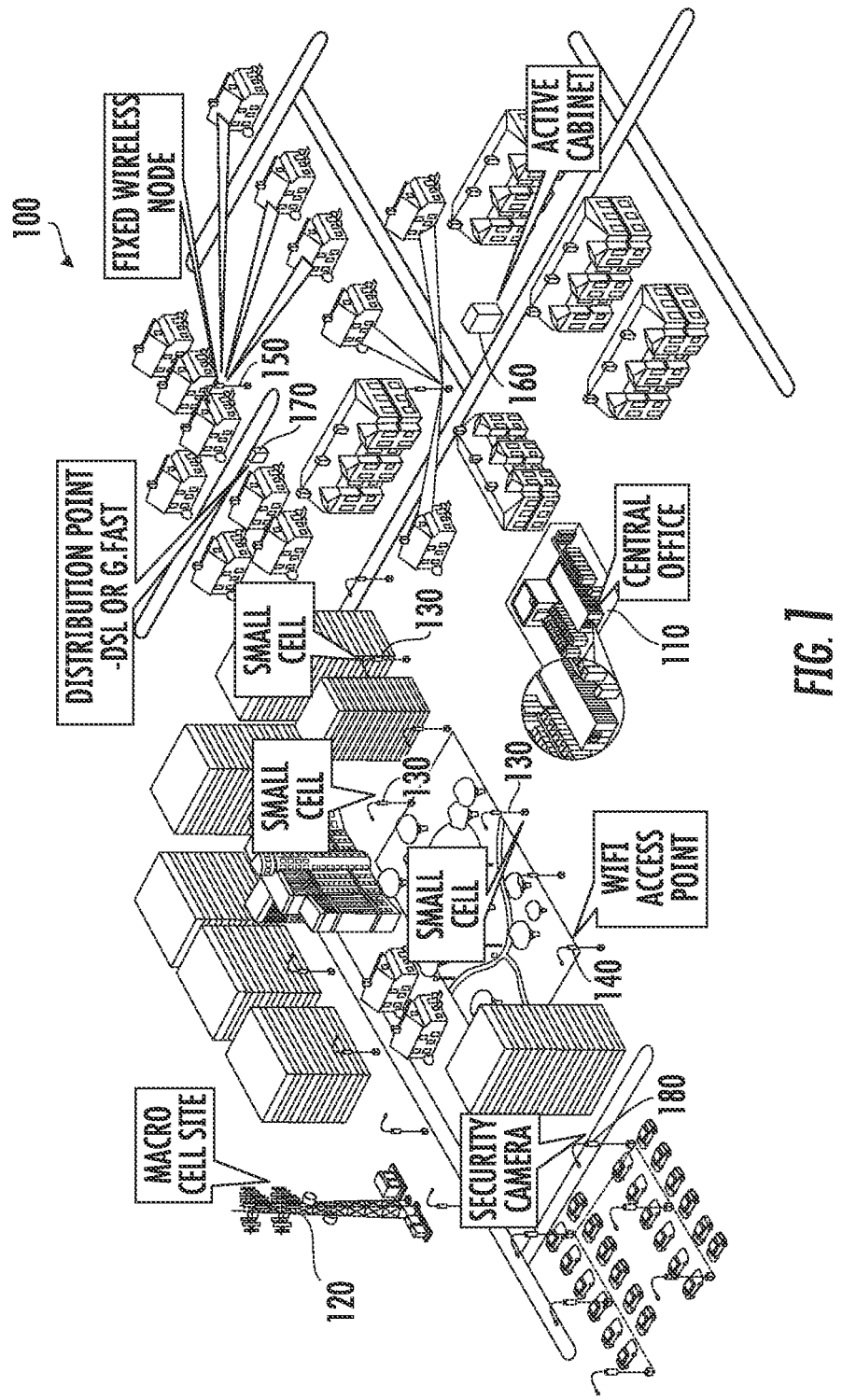
FIG. 1 is a schematic diagram illustrating the increasing power and data connectivity needs for information and communication technology infrastructure in high density access networks.

Cellular data traffic has increased by about 4,000 percent over the last decade, and is expected to continue increasing at a rate of over 50% per year for at least the next several years. Cellular operators are beginning to deploy 5G cellular networks in an effort to support the increased cellular data traffic with better coverage and reduced latency. One expected change in the cellular architecture that is anticipated with the deployment of 5G networks is a rapid increase in the number of so-called small cell base stations that are deployed. Generally speaking, a "small cell" base station refers to an operator-controlled, low-power radio access node that operates in the licensed spectrum and/or that operates in the unlicensed spectrum but provides operator-grade WiFi connectivity. The term "small cell" encompasses microcells, picocells, femtocells and metrocells that support communications with fixed and mobile subscribers that are within between about 10 meters and 300-500 meters of the small cell base station depending on the type of small cell used. The term small cell generally does not encompass in-building solutions such as distributed antenna systems that are typically implemented as part of the macrocell layer of a cellular network.

Small cell base stations are typically deployed within the coverage area of a base station of the macrocell network, and the small cell base stations are used to provide increased throughput in high traffic areas within the macrocell. This approach allows the macrocell base station to be used to provide coverage over a wide area, with the small cell base stations supporting much of the capacity requirements in high traffic areas within the macrocell. In heavily-populated urban and suburban areas, it is anticipated that more than ten small cells will be deployed within a typical 5G macrocell in order to support the increased throughput requirements. As small cell base stations have limited range, they must be located in close proximity to users, which typically requires that the small cell base stations be located outdoors, often on publicly-owned land such as along streets. Typical outdoor locations for small cell base stations include lamp posts, utility poles, street signs and the like, which are locations that either do not include an electric power source, or include a power source that is owned and operated by an entity other than the cellular network operator. A typical small cell base station may require between 200-1,000 Watts of power. As small cell base stations are deployed in large numbers, providing electric power to the small cell base station locations represents a significant challenge.

When deploying a new macrocell base station, a cellular operator will typically work with the local electric utility company to arrange to have alternating current ("AC") power provided to the site from the local electric power grid. While this process may be both time-consuming and expensive, the time required to plan, build and deploy a new macrocell base station may be as long as two years, allowing sufficient time for coordinating with the electric utility company, obtaining necessary permitting from local government agencies, and then having the local electric utility company deploy the connection to the electric power grid in order to deliver power to the site. Moreover, the cost associated with providing power to the macrocell base station, which may be on the order of $5,000 to $20,000, can readily be absorbed by a macrocell base station that serves thousands of users. Thus providing electric power to macrocell base stations has not raised major issues for cellular network operators. Unfortunately, however, the model for delivering electric power to macrocell base stations does not work well with small cell deployments, where the cellular network operator typically needs to deploy small cell base stations quickly and in a cost-effective manner. In order to meet these goals, cellular operators require a repeatable process for delivering electric power to small cell base station locations that preferably does not require involvement of third parties such as electric utility companies.

One solution that has been proposed for powering small cell base stations is the use of the above-mentioned composite power-data cables. Composite power-data cables allow a cellular network operator to deploy a single cable between a hub and a small cell base station that provides both electric power and backhaul connectivity to the small cell base station. The hub may be, for example, a central office, a macro cell base station or some other network operator owned site that is connected to the electric power grid. All cellular base stations must have some sort of backhaul connection to the core network, and with small cell base stations the backhaul connection is typically implemented as a fiber optic cabling connection. Since the cellular network operator already would typically deploy a fiber optic cable to a new small cell base station installation, changing the fiber optic cable to a power-plus-fiber cable provides a relatively low cost solution for also providing an electric power connection to the new small cell base station, particularly as the installation costs associated with installing a new cabling connection between a hub and the new small cell base station will typically exceed, and often far exceed, the additional cost associated with adding power conductors to the fiber optic cable. For example, the incremental cost of deploying (installing) a power-plus-fiber cable as compared to deploying a fiber optic cable is less than $1/foot, while the cost of deploying cables in the outside plant are on the order of $1.5/foot to $6/foot in typical installations. Moreover, in urban areas—which is one of the most common locations where new small cell base stations are being deployed—the cables often must be installed underground beneath concrete or asphalt surfaces. In such environments, the installation costs can be as high as $30-40/foot or even more.

While using composite power-data cables may be an improvement over more conventional solutions for powering small cell base stations and other remote network-connected devices, deploying long composite power-data cables can be expensive and time-consuming, and hence may not be a completely satisfactory solution. As such, new techniques for providing backhaul and power connectivity to 5G small cell base stations and other remote network-connected device are needed.

Power and data connectivity micro grids for information and communication technology (ICT) infrastructure have been proposed as a solution for powering small cell base stations and other remote network-connected devices. Power and data connectivity micro grids for ICT infrastructure in fault managed power network may be owned and controlled by cellular network operators which allows the cellular network operators to more quickly and less expensively provide power and data connectivity (backhaul) to new small cell base stations. The power and data connectivity micro grids may be cost-effectively deployed by over-provisioning the power sourcing equipment and cables that are installed to provide power and data connectivity to new installations such as new small cell base station installations.

The above-described power and data connectivity micro grids may include a network of composite power-data cables that are used to distribute electric power and data connectivity throughout a defined region. These micro grids may be deployed in high density areas, which is where most 5G small cell base stations will need to be deployed. Each micro grid may include a network of composite power-data cables that extend throughout a geographic area. The network of composite power-data cables (and the sourcing equipment supplying the network of composite power-data cables with power and data capacity) may be designed to have power and data capacity far exceeding the capacity requirements of existing nodes along the micro grid. Because such excess capacity is provided, when new remote network-connected devices are installed in the vicinity of a micro grid, composite power-data cables can be routed from tap points along the micro grid to the location of the new remote network-connected device (e.g., a new small cell base station). The newly installed composite power-data cables may themselves be over-provisioned and additional tap points may be provided along the new composite power-data cabling connections so that each new installation may act to further extend the footprint of the micro grid. This allows cellular network operators to incrementally establish their own power and data connectivity micro grids throughout high density areas, which means that when new small cell base stations, WiFi access points or other remote powered devices are deployed, they will often be in close proximity to at least one tap point along the micro grid. In many cases, the only additional cabling that will be required to power such new base stations is a relatively short composite power-data cable that connects the new small cell base station to an existing tap point of the micro grid. Moreover, by over-provisioning some or all of the newly-installed composite power-data cables, the above-described micro grids may naturally grow throughout high density areas allowing network operators to quickly and inexpensively add new infrastructure to their networks. The composite power-data cables may be implemented as power-plus-fiber cables, although other composite power-data cables (e.g., coaxial cables) may additionally and/or alternatively be used.

The power delivery component of the above-described power and data connectivity micro grids for ICT infrastructure may comprise a low voltage, direct current ("DC") power grid. The DC power signals that are distributed over the micro grid may have a voltage that is higher than the (AC) voltages used in most electric utility power distribution systems (e.g., 110 V or 220 V AC), which may help reduce power loss, but the voltage may be lower than 1500 V DC so as to qualify as a low voltage DC voltage under current standards promulgated by the International Electrotechnical Commission (IEC). For example, the micro grid may carry a 380 V DC power signal (or some other DC voltage greater than 48-60 V and less than 1500 V). Tap points may be installed along the composite power-data cables. The tap points may comprise intelligent remote distribution nodes that include a gated pass-through power bus that allows for daisy chain operation and/or splitting of the power signal, as well as one or more local ports that may be used to power remote powered devices that are co-located with the intelligent remote distribution node or in close proximity thereto. When a new composite power-data cable is installed, one or more unused intelligent remote distribution nodes may be pre-installed along the composite power-data cable to serve as tap points for information and communication infrastructure that is deployed in the future. The tap points may alternatively or additionally comprise splice enclosures that are installed along the composite power-data cables. These splice enclosures may be similar to conventional fiber optic splice enclosures and may include terminations for both the optical fibers and power conductors of the composite power-data cables. The splice enclosures may provide connection points for "branch" composite power-data cables that supply power and data connectivity to existing installations that are connected to the micro grid, may include a gated pass-through power bus, and/or may act as tap points for future installations.

Multiple composite power-data cables may be deployed that run in parallel between power and data connectivity source equipment and splice enclosures and/or intelligent remote distribution nodes in order to pre-install additional power and data capacity that can be tapped into later to support future installations. This allows power and data connectivity to be deployed to new installations while at the same time building out a highly over-provisioned micro grid of power and data connectivity resources that may be used to provide power and data connectivity to future installations. Such an approach can significantly reduce the costs of providing power and data connectivity to newly deployed equipment while also significantly reducing the time required to provide such power and data to a new installation. Moreover, additional power sourcing equipment devices may be installed as the micro grid grows, and in some cases power and data may be fed to splice enclosures and/or intelligent remote distribution nodes from multiple power sourcing equipment devices. This may increase the number of remote powered devices that may be supported by the micro grid and may provide redundancy in the event of a fault at one of power sourcing equipment devices.

As power signals are transmitted along a composite power-data cable, losses such as a voltage drop may be experienced by the power signals. For example, the voltage of the power signals may drop linearly with increased distance from the power sourcing equipment device. Various embodiments of the present inventive concepts may arise from the recognition that a power boost module along the composite power-data cable would improve the voltage level of the power signals by increasing the voltage of the power signals on the composite power-data cable near the power boost module. A power boost module that connects to a distributed power grid may add or remove power at various locations in the distributed power grid to increase network resiliency and efficiencies, reduce carbon footprints, and/or support lower cost systems.

The power boost module can "plug in" to any convenient location on the micro grid and may allow the micro grid to grow in small increments without adding a complete power hub cabinet. A power boost module may be used to reduce power losses associated with the voltage drop along the power portion of the power-data cables. As used herein the term "power hub" will be used interchangeably with the term "power sourcing equipment device" and the term "power boost module" will be used interchangeably with the term "power boost node". The power boost module may include an energy storage device that feeds power to the micro grid in high traffic time periods and pulls power from the micro grid to charge batteries during low traffic time periods. This type of power boost module that uses an energy storage device may not need an AC connection. Another type of power boost module may use an AC connection and operate to boost the power level of the network to either add capacity, link or mesh power networks, or increase network efficiency without adding a larger power hub cabinet. These power boost modules may be deployed in a hand hole, on a pole, or be strand mounted. The power boost modules that have an AC connection may have bidirectional capabilities with the utility grid. Power boost modules that are AC powered may include a grid re-injection feature that could provide power back to the utility providing AC power. The power boost modules that have a battery may have bidirectional capabilities between the DC micro grid and the battery. These power boost modules may also act as a converter between other energy sources such as solar, wind or other generators.

Before describing aspects of the present invention, the power and data connectivity micro grid concept will be discussed in greater detail with reference to FIGS. 1-8.

FIG. 1 is a schematic diagram illustrating the increasing power and data connectivity needs for information and communication technology infrastructure in high density access networks. As shown in FIG. 1, in an urban or suburban environment 100, a telecommunications provider such as a cellular network operator may operate a central office 110 and a macro cell base station 120 for ICT infrastructure. In addition, the telecommunications provider may operate a plurality of small cell base stations 130, WiFi access points 140, fixed wireless nodes 150, active cabinets 160, DSL distribution points 170, security cameras 180 and the like. All of these installations may require DC power to operate active equipment, and most, if not all, of these installations may also require data connectivity either for backhaul connections to the central office and/or for control or monitoring purposes. As described above, it may be both expensive and time consuming to provide local power sources for these installations.

In order to reduce costs and increase the speed at which electric power and data connectivity can be deployed to remote network-connected powered devices such as the remote devices 130, 140, 150, 160, 170, 180 illustrated in FIG. 1, the use of power-plus-fiber cables has been proposed as a cost-effective solution for providing power and data connectivity to remote devices. For example, PCT Publication No. WO 2018/017544 A1 discloses an approach for providing power and data connectivity to a series of remote powered devices in which power-plus-fiber cables extend from a power source to a plurality of intelligent remote distribution nodes. Each intelligent remote distribution node may include a "pass-through" port so that a plurality of remote distribution nodes may be coupled to the power source in "daisy chain" fashion. Intelligent remote powered devices may be connected to each intelligent remote distribution node and may receive power and data connectivity from the intelligent remote distribution node.

One drawback of the approach disclosed in PCT Publication WO 2018/017544 A1 is that as new installations are deployed, it is necessary to install another power-plus-fiber cable that runs from the power source to the new installation. Deploying such power-plus-fiber cables can be time consuming and expensive, particularly in urban environments.

The power source equipment and remote distribution node approach disclosed in PCT Publication WO 2018/017544 A1 may be extended so that cellular network operators may create a hard wired power and data connectivity micro grid throughout high density urban and suburban areas. As new installations (e.g., new small cell base stations, security cameras and the like) are deployed in such areas, the cellular network operator may simply tap into a nearby portion of the micro grid to obtain power and data connectivity without any need to run cabling connections all the way from the power and data source equipment to the new installation. The micro grids may be viewed as being akin to the backplane on a computer, as the micro grids extend throughout the area in which power and data connectivity are required and have excess power and data connectivity resources available so that new installations may simply "plug into" the micro grid at any of a large number of tap points.

Figure 2:
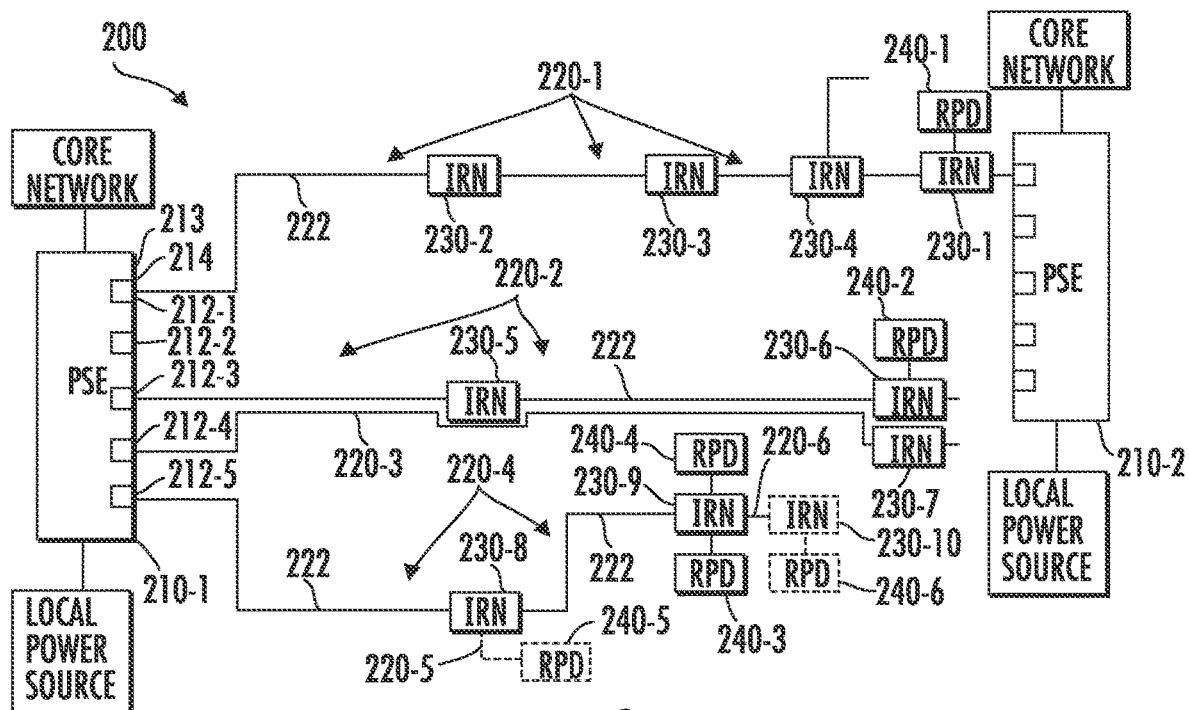
FIG. 2 is a schematic diagram illustrating a power and data connectivity micro grid.

FIG. 2 is a schematic diagram illustrating a power and data connectivity micro grid 200 as disclosed in U.S. patent application Ser. No. 16/507,483, filed Jun. 10, 2019, the entire content of which is incorporated herein by reference. As shown in FIG. 2, a power sourcing equipment ("PSE") device 210-1 may be provided that acts as an injection point for both power and data into the power and data connectivity micro grid 200. Each power sourcing equipment device 210 may include a plurality of power ports 213 and data ports 214. The power ports 213 and the data ports 214 will typically be implemented as power and data connectors, respectively, but other implementations are possible. For example, the power ports 213 and/or the data ports 214 could be implemented as openings in a housing of the power sourcing equipment device 210 that are configured to receive the power and/or data cables 213, 214. In some cases, a power port 213 and a data port 214 may be implemented together as a hybrid power-data port 212 that includes one or more power ports 213 and one or more data ports 214 that are implemented using, for example, a single hybrid connector. In other cases, the power ports 213 and the data ports 214 may be implemented separately (e.g., as separate connectors). In the description that follows, it will be assumed that the power ports 213 and the data ports 214 are implemented using hybrid power-data ports 212 for convenience, but it will be appreciated that any or all of the hybrid power-data ports 212 may be replaced with separate power ports 213 and the data ports 214 in other cases. Moreover, in some cases the data ports may be omitted.

Composite power-data cables 220 are connected to each hybrid power-data port 212 to extend the micro grid 200 across a geographic region. Each composite power-data cable 220 may comprise, for example, a single cable that includes both power conductors and optical fibers, one or more power cables and one or more fiber optic cables that are contained together within a common jacket, one or more power cables and one or more fiber optic cables that are coupled together (e.g., by a helical wrap) or any other cable or combination of cables that include both power conductors and a separate data transmission medium that may be used to carry both DC power as well as data. Coaxial cables are another type of composite power-data cable 220 that can be used. Additional composite power-data cables include telephone twisted pair cables with remote power feeding on some pairs and direct subscriber line (DSL) data on other pairs or with both power and DSL on the same pairs, and composite cables having larger conductors (e.g., 10-12 AWG) for power transmission and smaller gauge twisted pairs for data transmission. The composite power-data cables 220 will typically be connectorized. The composite power-data cables 220 may include fanouts of electrical conductors and optical fibers (which may comprise single conductors/fibers or groups thereof) that are individually connectorized, or may be connectorized using one or more hybrid power-data connectors. When coaxial cables are used to implement the composite power-data cables, the same conductors carry both the power and data signals and suitable mechanisms may be used to inject and extract the data communication signals.

Initially, only a single power sourcing equipment device 210-1 may be provided, and then additional power sourcing equipment devices 210 may be added as the micro grid 200 is expanded. One such additional power sourcing equipment device 210-2 is shown with dotted lines in FIG. 2. Each power sourcing equipment device 210 may be configured to output DC power through each hybrid power-data port 212 and to transmit and receive data through each hybrid power-data port 212. It should be noted that like elements may be designated with the same reference numeral in this specification and in the accompanying drawings. In some case, such like elements may be assigned two part reference numerals so that the elements may be referred to individually by their full reference numerals (e.g., power sourcing equipment device 210-2) or referred to collectively by the first part of their reference numeral (e.g., the power sourcing equipment devices 210).

A plurality of composite power-data cables 220 (e.g., power-plus-fiber cables) are connected to the respective hybrid power-data ports 212 of the power sourcing equipment device 210. For ease of description, in the discussion that follows, the composite power-data cables 220 will be described as being power-plus-fiber cables 220. It will be appreciated, however, that other types of composite power-data cables 220 may be used and that appropriate modifications may be made to the equipment attached to the cables.

Referring again to FIG. 2, each power-plus-fiber cable 220 may include a plurality of discrete cable segments 222. Each cable segment 222 may be connectorized with, for example, a fanout of individual power connectors and data connectors or with one or more hybrid power-data connectors. Each cable segment 222 may include a plurality of optical fibers and at least a pair of electrical conductors (e.g., 12 AWG or 16 AWG copper conductors). While typically both the optical fibers and the power conductors will be contained within a common protective jacket, the power-plus-fiber cables 220 may be implemented as separate fiber optic and power cable that are co-installed with each other (e.g., routed through the same conduit).

As is further shown in FIG. 2, a plurality of intelligent remote distribution nodes ("IRN") 230 may be installed along each power-plus-fiber cable 220. Remote powered devices ("RPD") 240 such as small cell base stations, WiFi access points, fixed wireless nodes, active cabinets, DSL distribution points, security cameras and the like may be connected to respective ones of the intelligent remote distribution nodes 230. In some cases, a single remote powered device 240 may be connected to an intelligent remote distribution nodes 230, while in other cases multiple remote powered devices 240 may be connected to the same intelligent remote distribution node 230.

When a new remote powered device 240 is being added to the network, the network operator may install a power-plus-fiber cable 220 that connects the new remote powered device 240 to a hybrid power-data port 212 on the power sourcing equipment device 210. For example, with reference to FIG. 2, the new remote powered device 240 may be the remote powered device 240-1. As shown in FIG. 2, a power-plus-fiber cable 220-1 may be installed that connects hybrid power-data port 212-1 on power sourcing equipment device 210-1 to an intelligent remote distribution node 230-1. The power-plus-fiber cable 220-1 may be purposefully over-provisioned to include excess power and data carrying capacity. For example, the power-plus-fiber cable 220-1 may include twelve, twenty-four, forty-eight or more optical fibers even though the new remote powered device 240-1 may only require one or two optical fibers for data connectivity. Likewise, the power-plus-fiber cable 220-1 may include a plurality of pairs of power conductors that are capable of transmitting significantly more power than is required by the new remote powered device 240-1. In addition, one or more additional intelligent remote distribution nodes 230-2, 230-3, 230-4 may be pre-installed along the power-plus-fiber cable 220-1, thereby dividing the power-plus-fiber cable 220-1 into a plurality of cable segments 222. The intelligent remote distribution nodes 230-2, 230-3, 230-4 may serve as tap points where additional power-plus-fiber cables 220 may be added to the micro grid 200 to provide power and data connectivity to other installations in the future.

As is further shown in FIG. 2, when another remote powered device 240-2 is added to the network, a pair of power-plus-fiber cables 220-2, 220-3 may be co-installed at the same time. Power-plus-fiber cable 220-2 may extend between another hybrid power-data port 212-3 on power sourcing equipment device 210-1 to an intelligent remote distribution node 230-6. The power-plus-fiber cable 220-2 may again be purposefully over-provisioned to include excess power and data carrying capacity, and may also have one or more additional intelligent remote distribution nodes (here node 230-5) pre-installed as a future tap point between the hybrid power-data port 212-3 and the intelligent remote distribution node 230-6. In addition, a second power-plus-fiber cable 220-3 may be installed at the same time as power-plus-fiber cable 220-2, even though the second power-plus-fiber cable 220-3 is not needed to support the remote powered device 240-2. Power-plus-fiber cables 220-2, 220-3 may be installed directly next to each other in, for example, the underground and/or aerial outside plant so that the incremental installation cost for deploying the additional power-plus-fiber cable 220-3 may be kept low. The additional power-plus-fiber cable 220-3 may have an intelligent remote distribution node 230-7 installed at the distal end thereof that may serve as a tap point for future additional power-plus-fiber cables 220. The intelligent remote distribution node 230-7 may be at a relatively large distance from the power sourcing equipment device 210. By pre-installing power-plus-fiber cable 220-3 at the time power-plus-fiber cable 220-2 is deployed, the need to later install power-plus-fiber cables 220 that extend all the way back to the power sourcing equipment device 210-1 may be avoided, because when new remote powered devices 240 are installed in the general vicinity of the remote powered device 240-2, the pre-installed power-plus-fiber cable 220-3 may be used to provide power and data connectivity to such newly-installed devices 240 through short power-plus-fiber connections to the intelligent remote distribution node 230-7.

Each pre-installed intelligent remote distribution node 230 may have low voltage and/or high voltage ports. The power sourcing equipment device 210 may output a low voltage DC power signals (e.g., 380 V) onto the power-plus-fiber cables 220. Since the low voltage DC power signal may be significantly higher than the DC voltages (e.g., 46-60 V DC) used to power most information and telecommunications infrastructure equipment, the power loss along the power-plus-fiber cables 220 may be reduced and/or the power carrying capacity of the hybrid power-plus-fiber cables 220 may be increased. Each intelligent remote distribution node 230 may include a pass-through power bus that passes DC power that is received over a first power-plus-fiber cable segment 222 at an input port of the intelligent remote distribution node 230 to a second power-plus-fiber cable segment 222 that is connected to an output port of the intelligent remote distribution node 230. Each intelligent remote distribution node 230 may further include a local power bus that taps a portion of the DC power signal from the pass-through power bus. Each intelligent remote distribution node 230 may also include step-down equipment such as a buck converter that reduces the voltage level of the tapped DC power signal to a level that is suitable for powering the remote powered devices 240 (e.g., 48-64 V DC). The pass-through power bus may facilitate "daisy-chaining" multiple intelligent remote distribution nodes 230 along a single power-plus-fiber cable 220 to support remote powered devices 240 at a plurality of locations. By providing intelligent remote distribution nodes 230 that have pass through power buses with multiple outputs, new branches may be deployed from an existing intelligent remote distribution node 230 that extend in new directions to power remote powered devices 240.

Once the micro grid 200 has been partially deployed, the expense associated with adding additional remote powered devices 240 may be reduced. For example, as shown in FIG. 2, the cellular network operator may initially install a power-plus-fiber cable 220-4 that is used to power a pair of remote powered devices 240-3, 240-4 via the local ports of an intelligent remote distribution node 230-9. When the power-plus-fiber cable 220-4 and the intelligent remote distribution node 230-9 were installed, the power-plus-fiber cable 220-4 was over-provisioned with significant excess power and data-carrying capacity, and an unused intelligent remote distribution node 230-8 was installed along the power-plus-fiber cable 240-4 between the power sourcing equipment device 210-1 and the intelligent remote distribution node 230-9. Thereafter, the cellular network operator may need to install additional remote powered devices 240 such as remote powered device 240-5 and/or remote powered device 240-6. A power-plus-fiber cable 220-5 (or other composite power-data cable) may be installed between the remoted powered device 240-5 and the intelligent remote distribution node 230-8 to provide power and data connectivity to the remote powered device 240-5. In many cases, the remote powered device 240-5 may be much closer to the intelligent remote distribution node 230-8 than it is to the power sourcing equipment device 210-1. As such, significant savings may be achieved since the cellular network operator can install a relatively short power-plus-fiber cable 220-5 to connect the remote powered device 240-5 to the micro grid 200. Remote powered device 240-6 may similarly be connected to the micro grid 200 by installing another intelligent remote distribution node 230-10 and connecting a power-plus-fiber cable 220-6 between intelligent remote distribution nodes 230-9 and 230-10. The installation of intelligent remote distribution node 230-10 also advantageously serves to further expand the power and data connectivity micro grid 200 throughout the geographic region, which may help further reduce the cost of installing additional remote powered devices 240 in the future.

As is further shown in FIG. 2, additional power sourcing equipment devices 210 such as power sourcing equipment device 210-2 may be added to the micro grid 200 over time. The power sourcing equipment devices 210-1, 210-2 may be located in geographically diverse locations to reduce power losses over the power-plus-fiber cabling connections 220. In addition, the second power sourcing equipment device 210-2 may be connected to some of the same intelligent remote distribution nodes 230 as is power sourcing equipment device 210-1. As a result, the remote powered devices 240 along such power-plus-fiber cables 220 may be powered by either power sourcing equipment device 210. This arrangement provides redundancy in case there is a failure at one of the power sourcing equipment devices 210 and/or one of the power-plus-fiber cables 220 is damaged.

Figure 3:
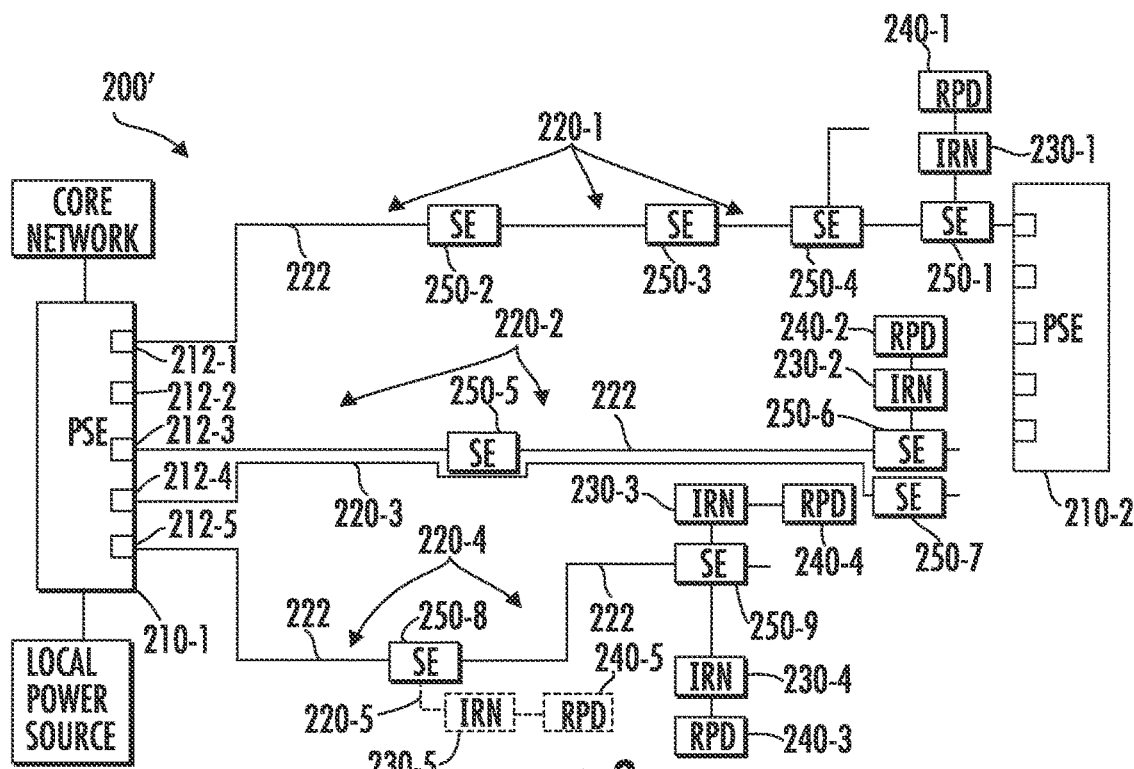
FIG. 3 is a schematic diagram illustrating another power and data connectivity micro grid.

FIG. 3 is a schematic diagram illustrating a power and data connectivity micro grid 200'. The power and data connectivity micro grid 200' is similar to the above-described power and data connectivity micro grid 200, except that the power and data connectivity micro grid 200' includes a plurality of splice enclosures 250. The splice enclosures 250 may be installed, for example, at the locations where intelligent remote distribution node 230 are deployed in the power and data connectivity micro grid 200 of FIG. 2. The splice enclosures 250 may comprise hardened enclosures that include splice trays for both power conductors and for optical fibers. The splice enclosures 250 may be installed, for example, either underground or in the aerial outdoor plant. Each splice enclosure 250 may further include a connectorized power input port and a connectorized data input port that are configured to receive a power-plus-fiber cable 220. The connectorized power input port and a connectorized data input port may be implemented as separate connectorized power and data ports or as a hybrid power-data connector. Each splice enclosure 250 may also include one or more connectorized power output ports and one or more connectorized data output ports (which can be implemented as separate power and data ports or as hybrid power-data ports) that are configured to receive respective power-plus-fiber cables 220. One pair of a power output port and a data output port may be viewed as a "pass-through" ports and the remaining pairs of power and data output ports may be viewed as "tap" ports that may be used to provide power and data connectivity to individual remote network-connected devices (or co-located groups thereof). When a new remote powered device 240-5 such as a small cell base station is to be deployed, an intelligent remote distribution node 230-5 may be installed at the site for the new small cell base station 240-5 (e.g., on a utility pole where the small cell radio 240-5 and antenna are mounted). A power-plus-fiber cable 220-5 may then be deployed between the newly-installed intelligent remote distribution node 230-5 and the closest splice enclosure 250-8 of the power and data connectivity micro grid 200', and a short jumper cable (or cables) may connect the intelligent remote distribution node 230-5 to the small cell radio 240-5. The splice enclosure 250-8 may be designed to output high voltage DC power signals (e.g., 380 V DC) to each output port thereof. The intelligent remote distribution nodes 230-5 may include step-down equipment such as a buck converter that reduces the voltage level of the DC power signal delivered thereto from the splice enclosure 250-8 to a level that is suitable for powering the remote powered devices 240-5 (e.g., 48-64 V DC). The intelligent remote distribution nodes 230-5 may or may not include pass-through power buses that allow daisy-chaining multiple intelligent remote distribution nodes 230-5 together.

To supply data connectivity to the newly-installed small cell base station 240-5, one or more of the optical fibers of power-plus-fiber cable 220-4 may be spliced in the splice enclosure 250-8 to connect to a data tap port of the splice enclosure 250-8. The data tap port of splice enclosure 250-8 may be connected to a data input port on an intelligent remote distribution node 230-5 via, for example a power-plus-fiber cable 220-5 (as shown) or by a separate optical jumper cable. Electrical and optical paths in the intelligent remote distribution node 230-5 may connect the power conductors and optical fibers of power-plus-fiber cable 220-5 to a local power port and a local data port, respectively, of the intelligent remote distribution node 230-5. The local power and data ports of the intelligent remote distribution node 230-5 are connected to the small cell base station 240-5 via, for example, separate power and optical jumper cables. In this fashion, the splice enclosure 250-8 and the intelligent remote distribution node 230-5 may provide power and data connectivity to the small cell base station 240-5.

The architecture of power and data connectivity micro grid 200' may be advantageous because the splice enclosures 250 may be relatively inexpensive since they may include significantly less technology than an intelligent remote distribution node 230, and hence a plurality of splice enclosures 250 may be installed along a power-plus-fiber cable 220 at relatively low cost. The splice enclosures 250 may provide a plurality of tap points along each power-plus-fiber cable 220 providing numerous locations where the cellular network operator may tap into the micro grid 200' to provide power and data connectivity for future installations.

Figure 4:
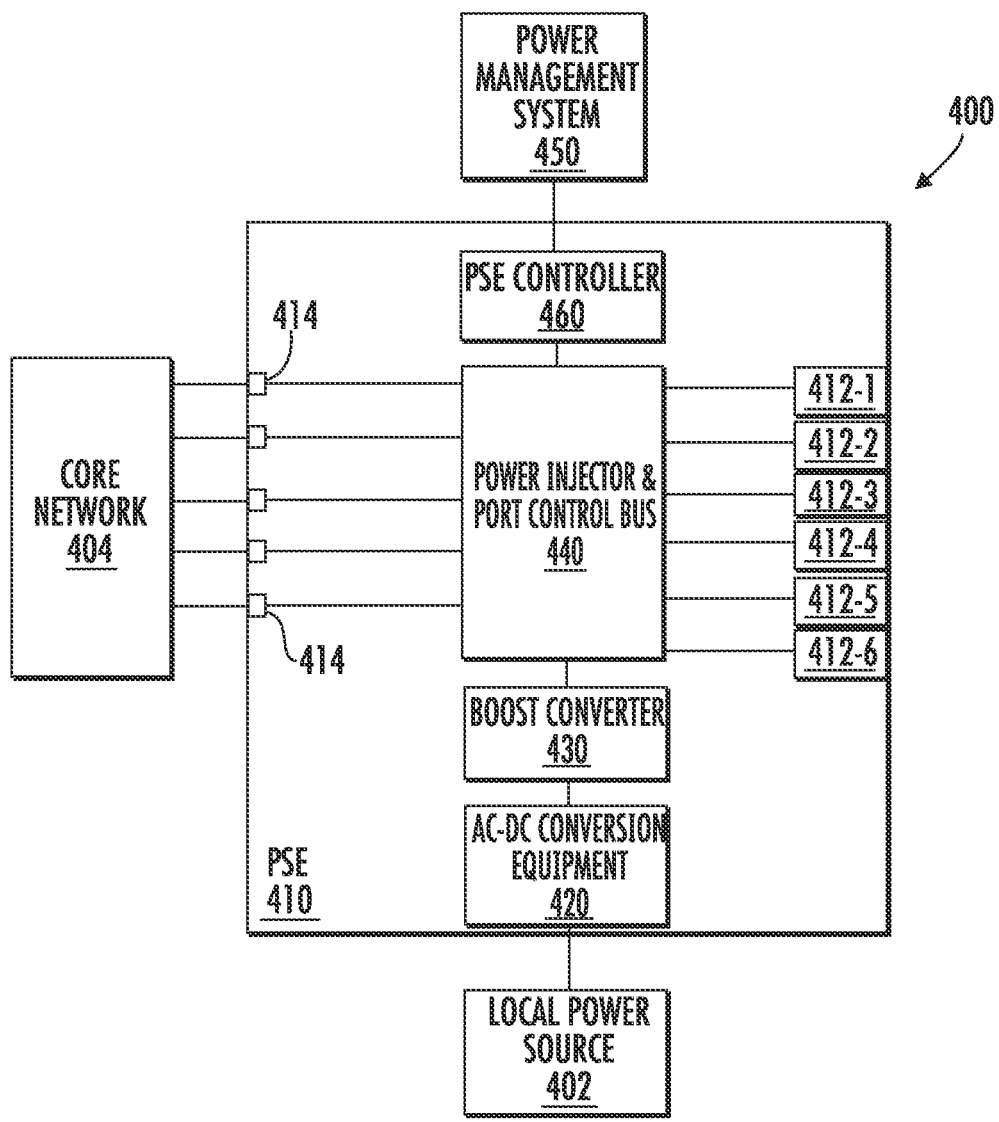
FIG. 4 is a schematic block diagram illustrating one of the power sourcing equipment devices of FIGS. 2 and 3.

FIG. 4 is a schematic block diagram illustrating a power source installation 400 that may be used to implement the power sourcing equipment devices 210 of FIGS. 2 and 3. As shown in FIG. 4, the power source installation 400 may include a local power source 402 and a power sourcing equipment device 410 that includes a plurality of hybrid power-data ports 412 (or, alternatively, separate power ports and data ports, as discussed above). The power sourcing equipment device 410 may comprise one or more transformers, converters and/or power conditioners that convert AC or DC supplied power received from the local power source 402 into DC power that is provided at the hybrid power-data ports 412. The power source installation 400 may also have connections to a telecommunications network 404 such as, for example, a core network of the cellular network operator. The power sourcing equipment device 210 may be located at a central office or other data distribution node of the cellular operator where a connection is available to the core network 404, or may be located closer to the micro grid and connected to the core network 404 via, for example, fiber optic cabling connections.

The local power source 402 will typically comprise a connection to utility-provided AC power, although other local power sources may be used. The power sourcing equipment device 410 may include AC-DC power conversion equipment 420 that converts the AC power into a plurality of DC power signals that may be output through the hybrid power-data ports 412 (or through separate power data ports). The power sourcing equipment device 410 may further include a boost converter 430 that steps of the voltage of the DC power signals to a desired level such as, for example, 380 V. In some cases, the stepped up voltage level may be between 260-1500 V DC. Increasing the voltage of the DC power signal reduces the current levels, which may reduce $I^2R$ power losses as the power signals are delivered over cabling connections 220 to the remote powered devices 240. Furthermore, during network expansion, adding a boost module will add increased capacity on an incremental basis, whereas adding another power sourcing equipment to that bus will be higher cost and may provide significantly more than the needed power level. The power boost provides a good intermediate power source to the power distribution network. For example, the power sourcing equipment may provide 10 kW to 30 kW, but the boost circuit may provide about 2 kW, which is enough of a power boost to handle the addition of one or two added powered devices.

The power sourcing equipment device 410 further includes a power injector and port control bus 440 that is coupled to the output of the boost converter 430 or the output of the AC-DC conversion equipment 420 if the boost converter 430 is not included on the power sourcing equipment device 410. The power injector and port control bus 440 may be configured to selectively inject DC power onto the electrical conductor pairs included in the hybrid power-data ports 412 in order to inject DC power onto the power-plus-fiber cables 220 that are connected to the respective hybrid power-data ports 412 (or through separate power data ports). A power management system 450 may also be part of the power source installation 400, and may be internal or external to the power sourcing equipment device 410. The power management system 450 manages power delivery to the remote power devices 240 by enabling and disabling the hybrid power-data ports 412 of the power sourcing equipment device 410.

The power sourcing equipment device 410 further includes a plurality of data ports 414 that may be coupled to the core network 404 of the cellular network operator. Data may be transferred between the core network 404 and the power sourcing equipment device 410 via the data ports 414. The data ports 414 may comprise, for example, fiber optic connectors. However, the data ports 414 may alternatively and/or additionally comprise electrical connectors, wireless links or the like. The data ports 414 may be coupled to the hybrid power-data ports 412 (or to individual data ports if the hybrid ports 412 are replaced with separate power and data ports) through, for example, the power injector and port control bus 440.

The power source installation 400 may be configured to control the delivery of power to each of the hybrid power-data ports 412 as well as to control the transfer of data between the hybrid power-data ports 412 and the core network 404. The power injector and port control bus 440 may be configured to control both the delivery of power to the hybrid power-data ports 412 and the transfer of data between the hybrid power-data ports 412 and the data ports 414, and may include, for example, one or more optical switches.

Figure 5:
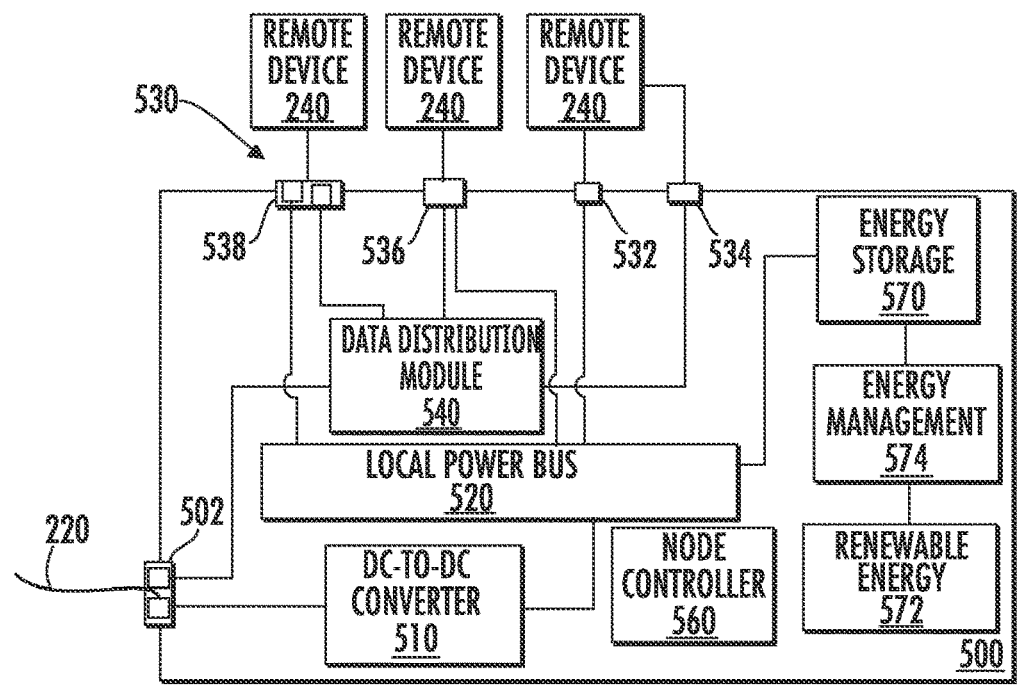
FIGS. 5 and 6 are schematic block diagrams of intelligent remote distribution nodes that may be used in power and data connectivity micro grids.

FIG. 5 is a schematic block diagram of an intelligent remote distribution node 500 that may be used in the above-described power and data connectivity micro grids. For example, the intelligent remote distribution nodes 230 that are discussed above with reference to FIG. 3 may be implemented using the intelligent remote distribution nodes 500 of FIG. 5.

As shown in FIG. 5, the intelligent remote distribution node 500 may include an input port 502, a uni-directional or bi-directional DC-to-DC converter 510, a local power bus 520, a plurality of local ports 530 and a data distribution module 540. The input port 502 and the local ports 530 may be implemented as hybrid power-data ports or as individual power and data ports. The intelligent remote distribution node 500 may be configured to receive power and data from an external source (e.g., from a power sourcing equipment device 210 or from a splice enclosure 250 via a composite power-data cable) and to deliver the received power and data in a suitable format to one or more remote powered devices 240.

The intelligent remote distribution nodes 500 may receive low voltage DC power signals such as, for example, 380 V DC power signals. The DC power signal may be received at the input port 502. The input port 502 may comprise, for example, a hybrid power-data connector that receives a power-plus-fiber cable 220. The power conductors of the input port 502 may be coupled to the DC-to-DC converter 510. If the DC-to-DC converter 510 is a bi-directional DC-to-DC converter, it may operate as a buck converter with respect to power signals received from the input port 502 and may operate as a boost converter with respect to power signals that are passed from the DC-to-DC converter 510 to the input port 502. Thus, while the buck converter feeds the remote device, DC-DC boost is provided for power distribution network technologies. The DC-to-DC converter 510 is coupled to a local power bus 520 that receives stepped-down power signals from the DC-to-DC converter 510 and which can also deliver stepped-up power signals to the DC-to-DC converter 510. The local power bus 520 may be coupled to one or more of the local ports 530 that act as tap ports. Each local port 530 may be connected to a remote powered device 240 to provide DC power and data connectivity to such devices 240.

The input port 502 may also include data paths that connect to data carrying elements of any composite power-data cable 220 connected to the input port 502. The data paths of the input port 502 may be coupled to the data distribution module 540. The data distribution module 540 may include a switching unit and appropriate media conversion equipment so that the data distribution module 540 may exchange data between the local ports 530 in a suitable format. The data distribution module 540 may or may not convert data before forwarding the data to a local port 530 or to the input port 502.

The local ports 530 may be implemented as conventional DC power port 532 that receives DC power directly from the local power bus 520 and a separate fiber optic port 534 that exchanges optical data with the data distribution module 540. Separate power and fiber optic jumper cables may be used to connect the DC power port 532 and the fiber optic port 534 to a remote powered device 240. Alternatively, the local power ports 530 may comprise PoE ports 536, in which case the local power bus 520 may include PoE equipment and may deliver power in a suitable format to the local PoE ports 536 so that the remote powered device 240 may be powered over an Ethernet cable that extends between the local port 536 and a remoted powered device 240. The data distribution module 540 may include optical-to-Ethernet and Ethernet-to-optical interfaces that convert the data received over the power-plus-fiber cable 220 into Ethernet format for transmission over the Ethernet cable coupled to local port 536 and that convert the data received at local port 536 from the remote powered device 240 into an optical signal that may be transmitted through the input port 502 back to the power sourcing equipment device 210.

In still other cases, the local power port(s) 530 may comprise hybrid power-data ports that are connected to remote powered devices 240 via respective power-plus-fiber cables 220. FIG. 5 illustrates an intelligent remote distribution node 500 that includes various different types 532/534; 536; 538 of local ports 530.

As is further shown in FIG. 5, the intelligent remote distribution node 500 may further include an energy storage device 570 such as a battery and may also include a renewable energy device 572 such as solar cells, a turbine or the like. A energy storage and management system 574 may be included in the intelligent remote distribution node 500 that may control operation of the energy storage device 570 and any renewable energy device 572. For example, if a power sourcing equipment device 210 fails, the energy storage and management system 574 may control the energy storage device 570 and/or the renewable energy device 572 to deliver power to the local power bus 520 and from the local power bus 520 to the bi-directional DC-to-DC converter 510, and may control the bi-directional DC-to-DC converter 510 to step-up the voltage of the power received from the energy storage device 570 and any renewable energy device 572 so that a higher voltage DC power signal may be output through the input port 502 to power other remote powered devices 240 in the micro grid 200.

The intelligent remote distribution node 500 further includes a node controller 560 that may control overall operation of the intelligent remote distribution node 500.

Figure 6:
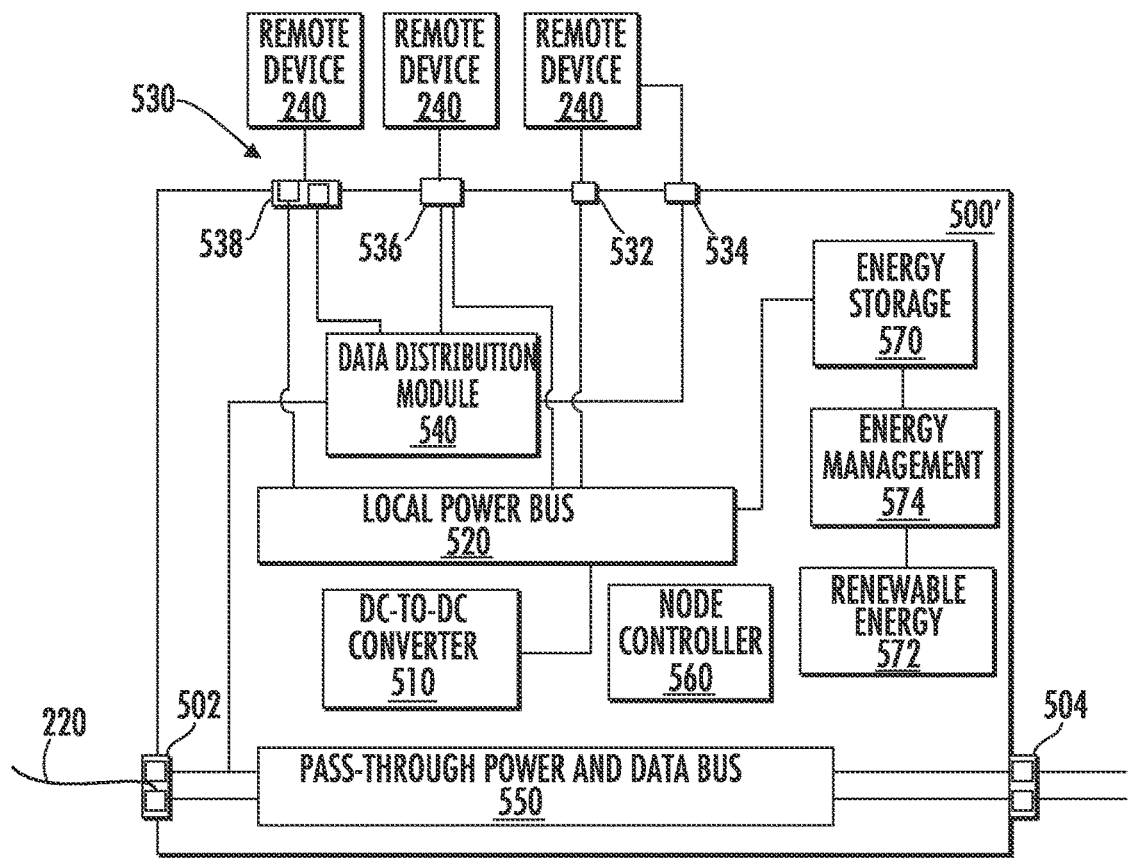

FIG. 6 is a schematic block diagram of another intelligent remote distribution node 500' that may be used in the above-described power and data connectivity micro grids. As can be seen, the intelligent remote distribution node 500' may be identical to the intelligent remote distribution node 500 except that intelligent remote distribution node 500' further includes a pass-through power and data bus 550 and an output port 504. The output port 504 may be implemented as a hybrid power-data port or as a separate power output port and a data output port. The intelligent remote distribution node 500' may be suitable for use in the power and data micro grid 200 discussed above with reference to FIG. 2.

Each intelligent remote distribution node 230 may be configured to handle a rated amount of power. For example, an intelligent remote distribution node 230 may be rated to deliver up to 1000 Watts of power to a connected remote powered device 240. The power conversion efficiency of the DC-to-DC converter included in the intelligent remote distribution node 230 may be a function of the power drawn by the remote powered device 240. The intelligent remote distribution nodes 230 may be designed, for example, to achieve peak power conversion efficiency when their converters are operating at the peak rated power delivery for the remote powered device (e.g., 1000 Watts in this example).

In practice, many remote powered devices draw varying levels of power. For example, a small cell base station may draw peak power during periods of heavy usage (e.g., during rush hour, lunch time, etc.) but may draw significantly lower levels of power at other times (e.g., at night). As such, the power converters in the intelligent remote distribution nodes 230 may often not provide peak power conversion efficiency. While the reduction in power conversion efficiency often is relatively small (e.g., from 95% to 93%), amount of power drawn over the power and data micro grids may be quite large, and hence even small reductions in power conversion efficiency can result in large increases in the operating expenses for the cellular network operator. As discussed above with reference to FIGS. 5 and 6, the intelligent remote distribution nodes 230 may include an energy storage device that may allow the intelligent remote distribution nodes to operate at peak power conversion efficiency a greater percentage of the time.

Referring again to FIG. 5, during times when a connected remote powered device 240 is drawing less than the full rated power for the DC-to-DC converter 510, the excess power generated by the DC-to-DC converter 510 may be used to charge the energy storage device 570 (so long as the energy storage device 570 is not fully charged). Then, in situations where the remote powered device 240 draws more power than the DC-to-DC converter 510 can output, the energy storage device 570 may augment the power provided by the DC-to-DC converter 510 to meet the power requirements of the remote powered device 240. Since the DC-to-DC converter 510 can be run at peak efficiency anytime the remote powered device 240 draws power in excess of the rated capacity of the DC-to-DC converter 510, as well as any time the energy storage device 570 is being recharged, the intelligent remote distribution node 500 may operate, on average, at high power conversion levels, reducing a cellular network operators operating expenses. The energy storage device 570 may also provide backup power during power black outs.

Figure 7:
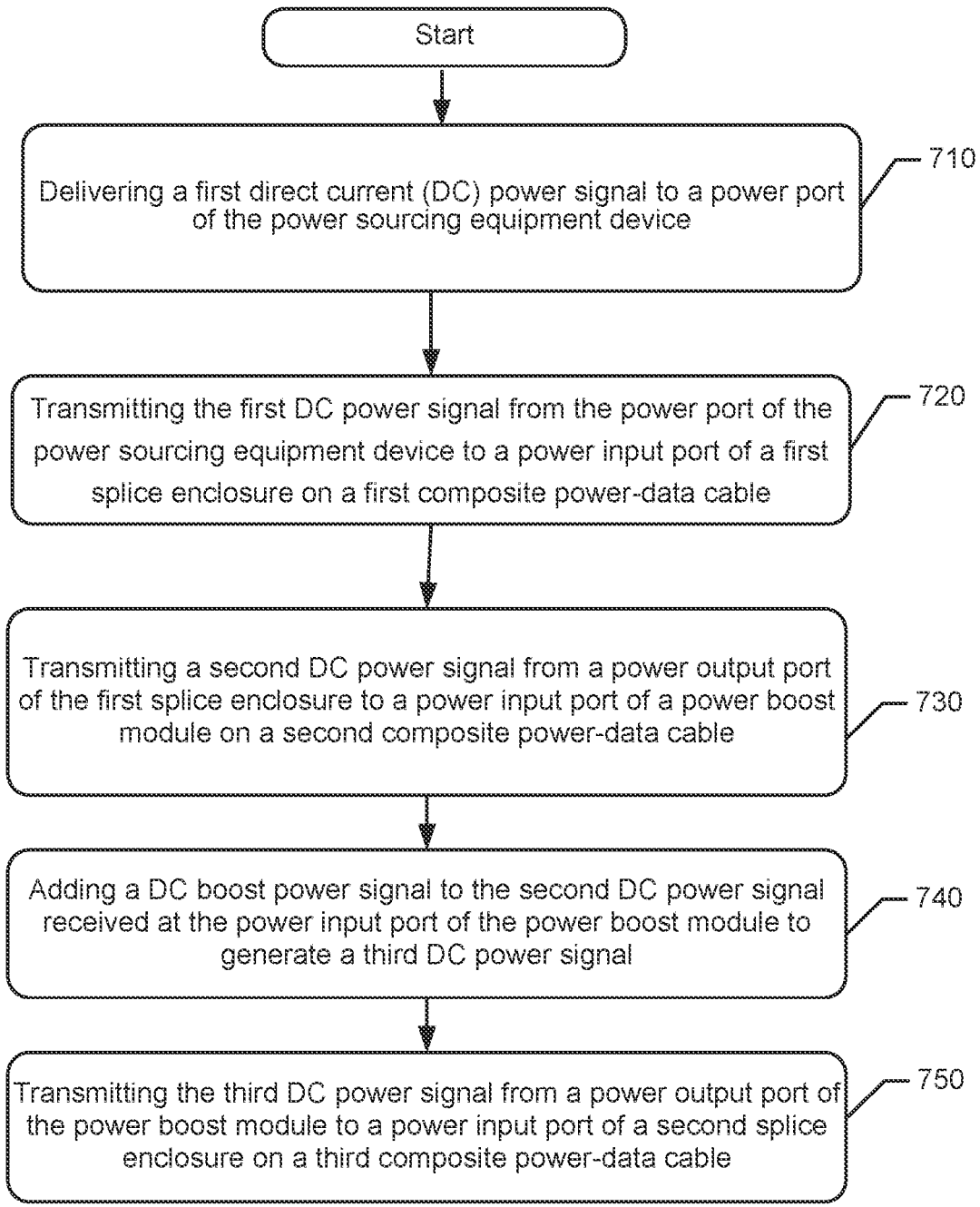
FIGS. 7-8 are flowcharts of operations performed by the power boost module of FIGS. 9 and 12 according to embodiments of the present invention.
Figure 8:
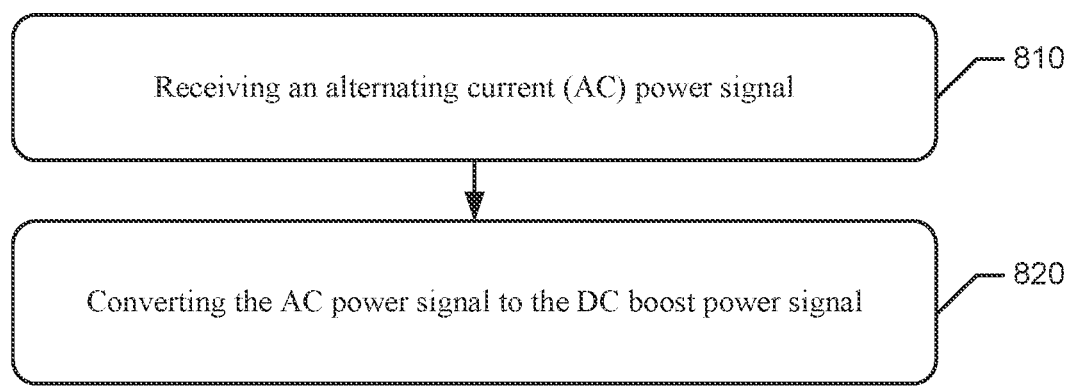
Figure 9:
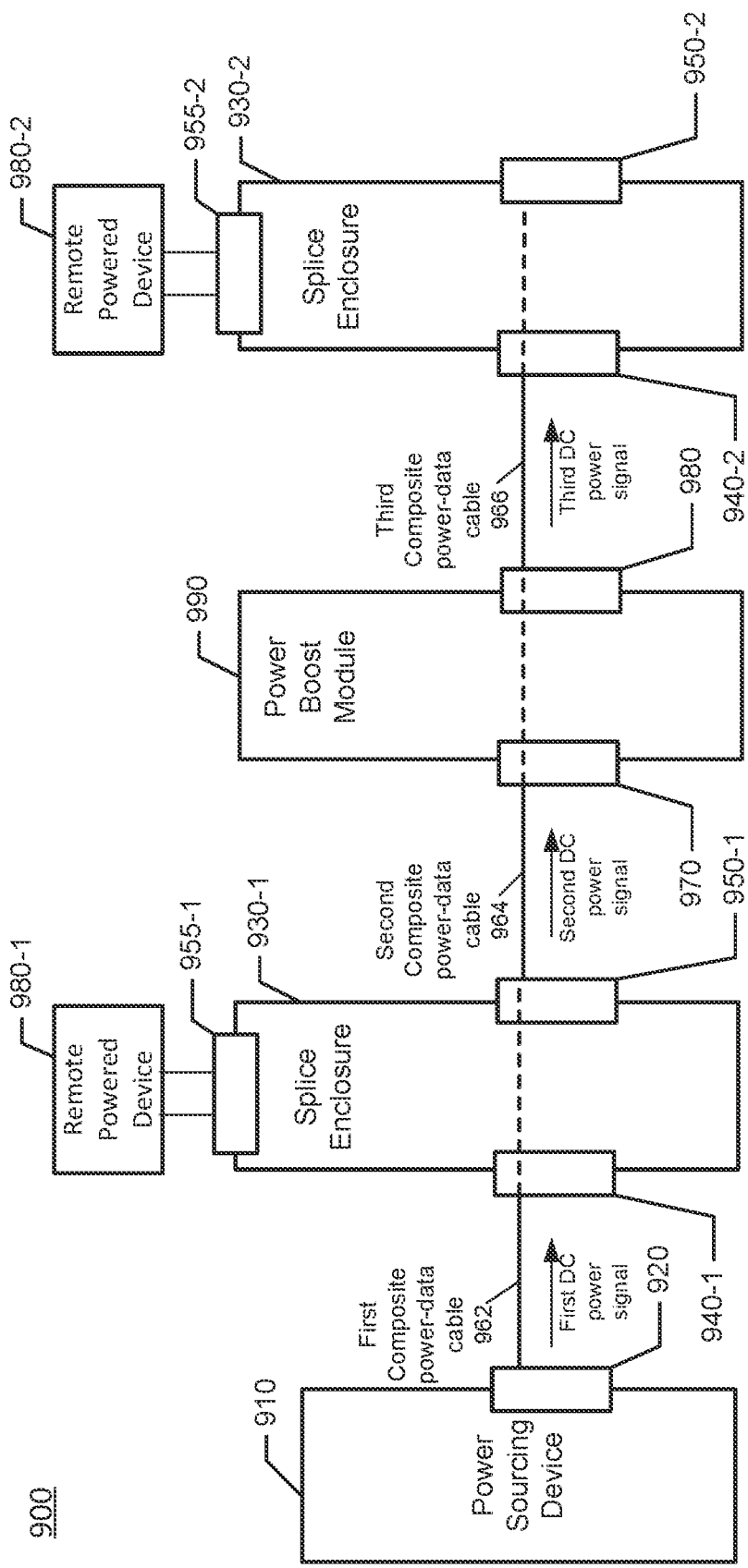
FIG. 9 is a schematic diagram illustrating a power and data connectivity micro grid including a power boost module according to embodiments of the present invention.

FIGS. 7 and 8 are flowcharts of operations performed by a power and data connectivity micro grid 200 of FIG. 2, data connectivity micro grid 200' of FIG. 3, and/or data connectivity micro grid 900 of FIG. 9 that includes a power boost module, according to embodiments of the present invention. Referring to FIG. 7, boosting power in the power and data connectivity micro grid 900 of FIG. 9 includes delivering a first DC power signal to a power port 920 of the power sourcing equipment device 910, at block 710. The first DC power signal from the power port 920 of the power sourcing equipment device 910 may be transmitted to a power input port 940-1 of a first splice enclosure 930-1 on a first composite power-data cable 962, at block 720. A second DC power signal from a power output port 950-1 of the first splice enclosure 930-1 may be transmitted to a power input port 970 of a power boost module 990 on a second composite power-data cable 964, at block 730. A DC boost power signal may be added to the second DC power signal received at the power input port 970 of the power boost module 990 to generate a third DC power signal, at block 740. The third DC power signal may be transmitted from a power output port 980 of the power boost module 990 to a power input port 940-2 of a second splice enclosure 930-2 on a third composite power-data cable 966, at block 750. The first composite power-data cable 962, the second composite power-data cable 964, and the third composite power-data cable 966 of FIG. 9 are connected to a common bus that carries power and/or data. This common bus is part of a power bus architecture that provides power distribution technologies that includes a common DC bus carrying power to each of the remote devices or powered devices.

An exit DC voltage of the first DC power signal at the power input port of the first splice enclosure may be less than an entry voltage of the first DC power signal at the power port of the power sourcing equipment device. The DC boost power signal added to the second DC power signal received at the power input port of the power boost module may result in an entry voltage of the third DC power signal at the third composite power-data cable that is greater than the an exit DC voltage of the second DC power signal that was received at the power input port of the power boost module. The boost module may be on a common power bus that either pulls power from the common power bus, resulting in a voltage drop, or adds power to the common power bus, resulting in a voltage increase. The voltage on the common power bus may be a continuous voltage, with a power profile consistent with the example voltages illustrated in FIG. 11B and/or FIG. 11C when a boost module is used. The DC boost power signal may be generated by a rechargeable battery unit. The rechargeable battery unit may be charged during periods of low power usage by the power and data connectivity micro grid. In some embodiments, the DC boost power signal may be generated based on an AC power signal from an AC power unit. Referring to FIG. 8, the AC power signal may be received by a DC power boost generator, at block 810. The AC power signal may be converted to the DC boost power signal, at block 820.

FIG. 9 is a schematic diagram illustrating how a power boost module may be used in the above-described power and data connectivity micro grid. Referring to FIG. 9, a power and data connectivity micro grid 900 may include a power sourcing equipment device 910 that is connected to splice enclosure 930-1 by a composite power-data cable. The composite power-data cable may be a power bus including portions of the composite power-data cable 962, 964, and 966 with continuous voltage levels across the various portions spanning splice enclosures 930-1, 930-2 and the power boost module 990. The power sourcing equipment device 910 transmits DC power signals from power port 920 on the composite power-data cable 962 to a power input port 940-1 of splice enclosure 930-1. The splice enclosure 930-1 supplies power to a remote power device 980-1 through a tap port 955-1. The power signals are routed from splice enclosure 930-1 through power output port 950-1 through composite power-data cable 964 to a power boost module 990. The DC power signals are transmitted on the composite power data cable 964 to power input port 970 of the power boost module 990. The power boost module 990 is configured to add a DC boost power signal to the DC power signal that is received at the power input port 970. DC Power signals are output by the power boost module 990 through power output port 980. The DC power signals from the power boost module 990 are transmitted along composite power-data cable 966 to the power input port 940-2 of splice enclosure 930-2. The splice enclosure 930-2 supplies power to a remote power device 980-2 through a tap port 955-2. The power signals are routed from splice enclosure 930-2 through power output port 950-2 along another composite power-data cable (not shown) to other portions of the power and data connectivity micro grid 900.

Figure 10:
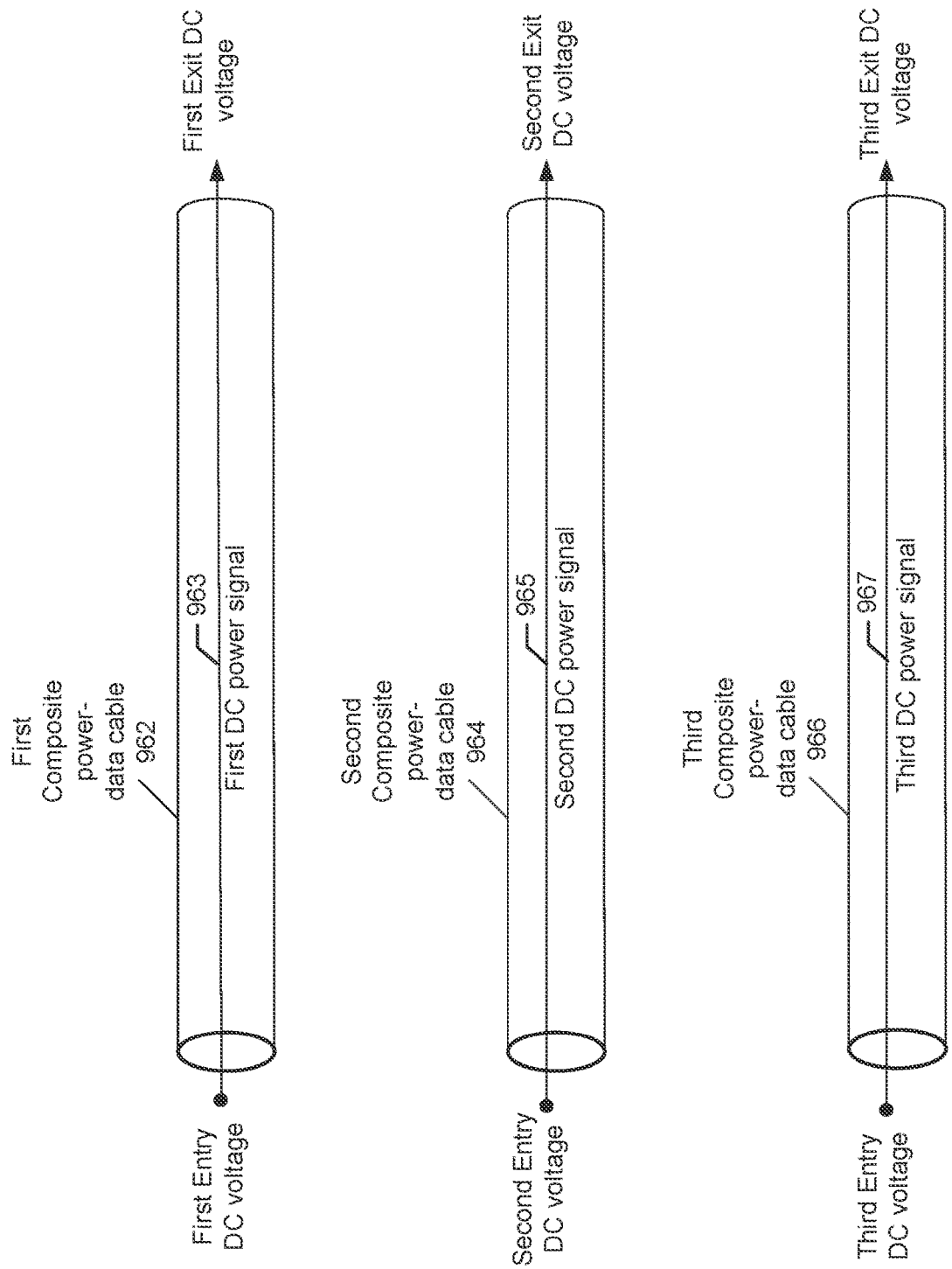
FIG. 10 is a schematic diagram illustrating composite power-data cables of the power and data connectivity micro grid of FIG. 9 according to embodiments of the present invention.

FIG. 10 is a schematic diagram illustrating composite power-data cables of the power and data connectivity micro grid 900 of FIG. 9 according to embodiments of the present invention. Referring now to FIG. 10, a first composite power-data cable 962 is configured to transmit the first DC power signal 963 from the power port 920 of the power sourcing equipment device 910 to the power input port 940-1 of the first splice enclosure 930-1. A second composite power-data cable 964 is configured to transmit the second DC power signal 965 from the power output port 950-1 of the first splice enclosure 930-1 to the power input port 970 of the power boost module 990. A third composite power-data cable 966 is configured to transmit a third DC power signal 967 from the power output port 980 of the power boost module 990 to the power input port 940-2 of the second splice enclosure 930-2. The voltages of power signals may drop along the composite power-data cables 962, 964, and/or 966 as the distance traveled by the power signals from the power sourcing equipment device 910 increases. As such, respective exit voltages of the DC power signals 963, 965, 967 of composite power-data cables 962, 964, 966 may be less than respective entry voltages of the DC power signals 963, 965, 967.

Referring again to FIGS. 9 and 10, a DC boost power signal from the power boost module 990 is added to the second DC power signal 965 received at the power input port 970 of the power boost module 990. This operation results in an entry voltage of the third DC power signal 967 at the third composite power-data cable 966 that is greater than the an exit DC voltage of the second DC power signal 965 that was received at the power input port 970 of the power boost module 990.

Figure 11A:
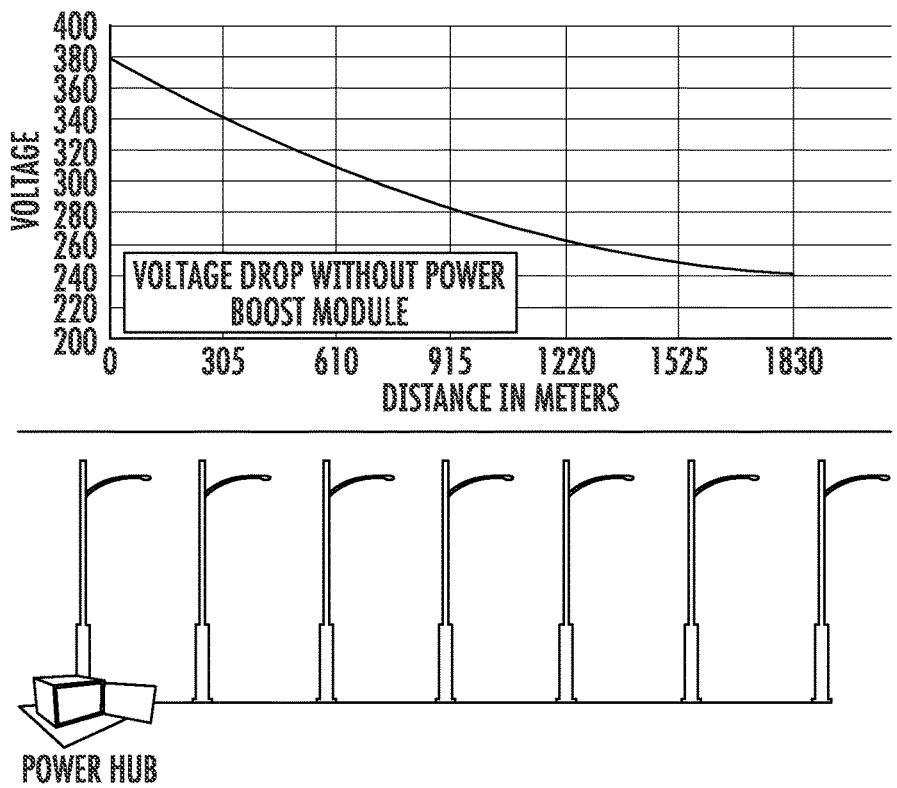
FIG. 11A-11C are graphs that illustrate the voltage of power signals in the power and data connectivity micro grid of FIG. 9.
Figure 11B:
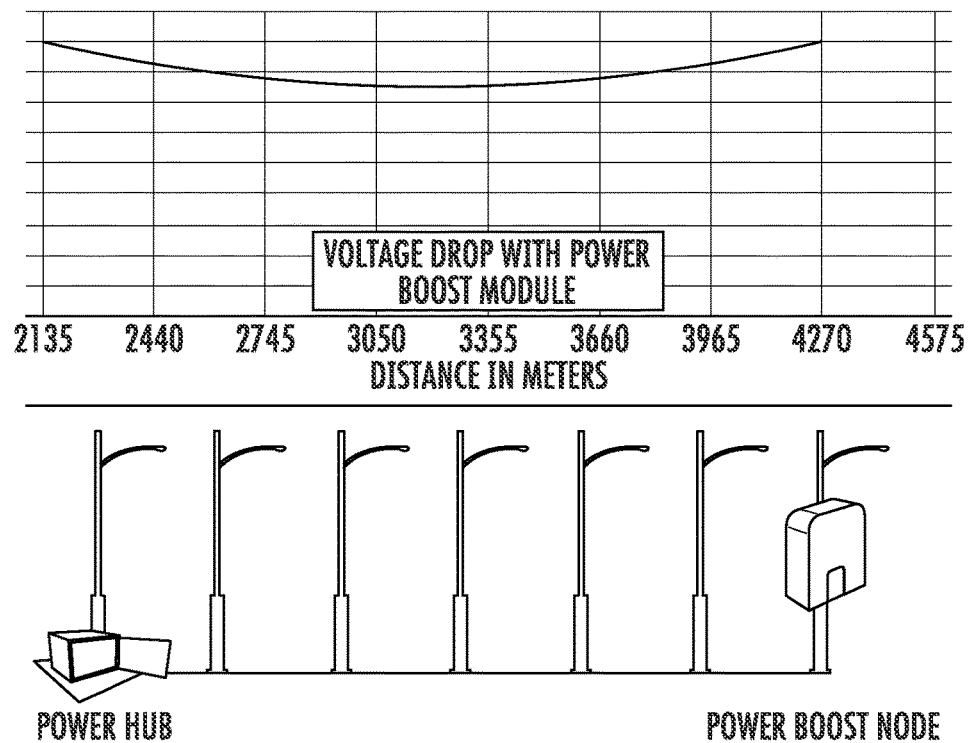
Figure 11C:
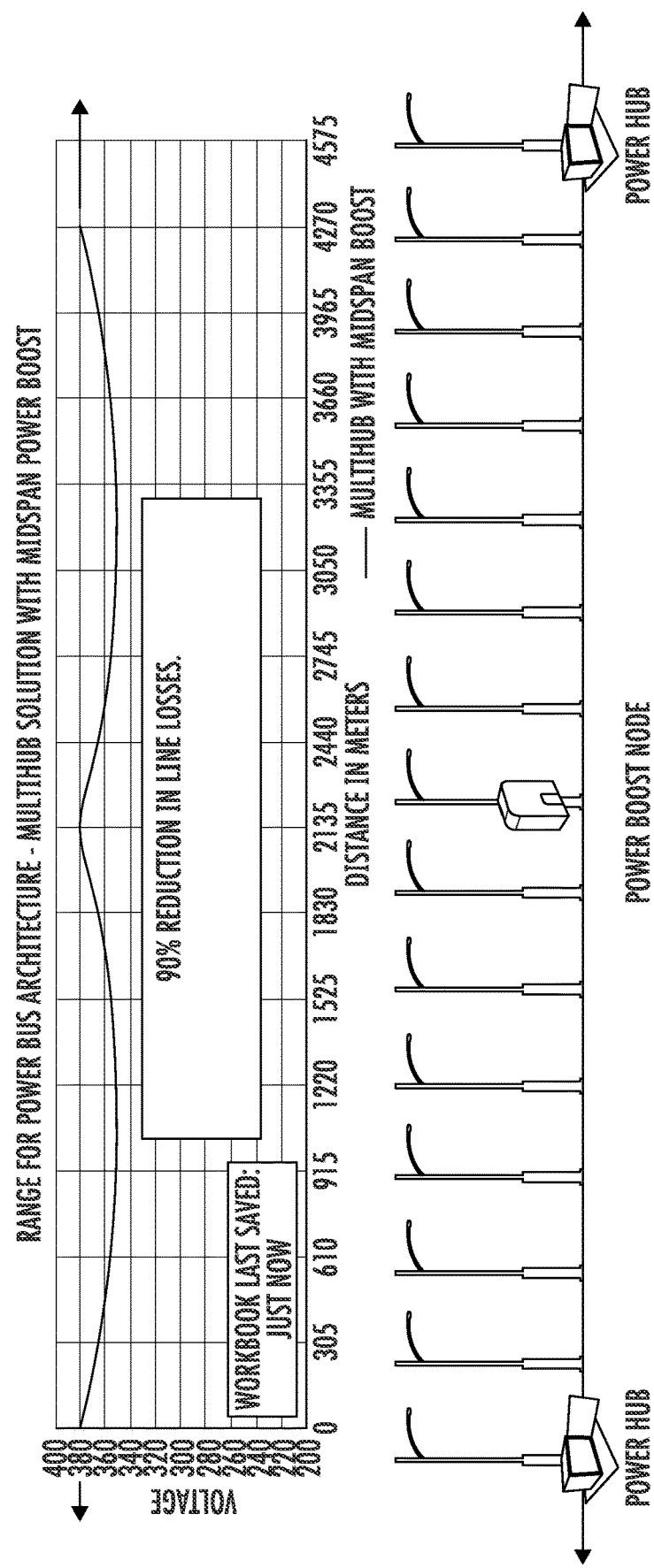

FIGS. 11A-11C are graphs that illustrate the voltage of power signals in the power and data connectivity micro grid of FIG. 9. FIG. 11A illustrates the voltage of power signals from a power hub (i.e., power sourcing equipment device 910 of FIG. 9) along composite power-data cables that are connected to various splice enclosures when a power boost module is not present. The voltage level of power signals may drop along the composite power-data cables as the distance from the power hub increases. FIG. 11B illustrates the voltage of power signals from a power hub along composite power-data cables that are connected to various splice enclosures when a power boost module is present. The voltage level of power signals drops along the composite power-data cables as the distance from the power hub increases towards the center of the power line. However, as the distance along the composite power-data cables to the power boost module is reduced, even when the distance from the power hub increases, the voltage drop is reduced. In other words, the lowest voltage of the power signals is between the power hub and the power boost module since the voltage of the power signals is higher as the distance is closer to either the power hub or the power boost module. FIG. 11C illustrates the voltage of power signals along composite power-data cables that are connected to various splice enclosures between power hubs that have a power boost module therebetween. As seen in FIG. 11B the voltage level of power signals are higher at shorter distances from either a power hub or a power boost module. Thus, there may be up to a 90% reduction in line losses of the power signals on composite power-data cables in the power and data connectivity micro grid.

Figure 12:
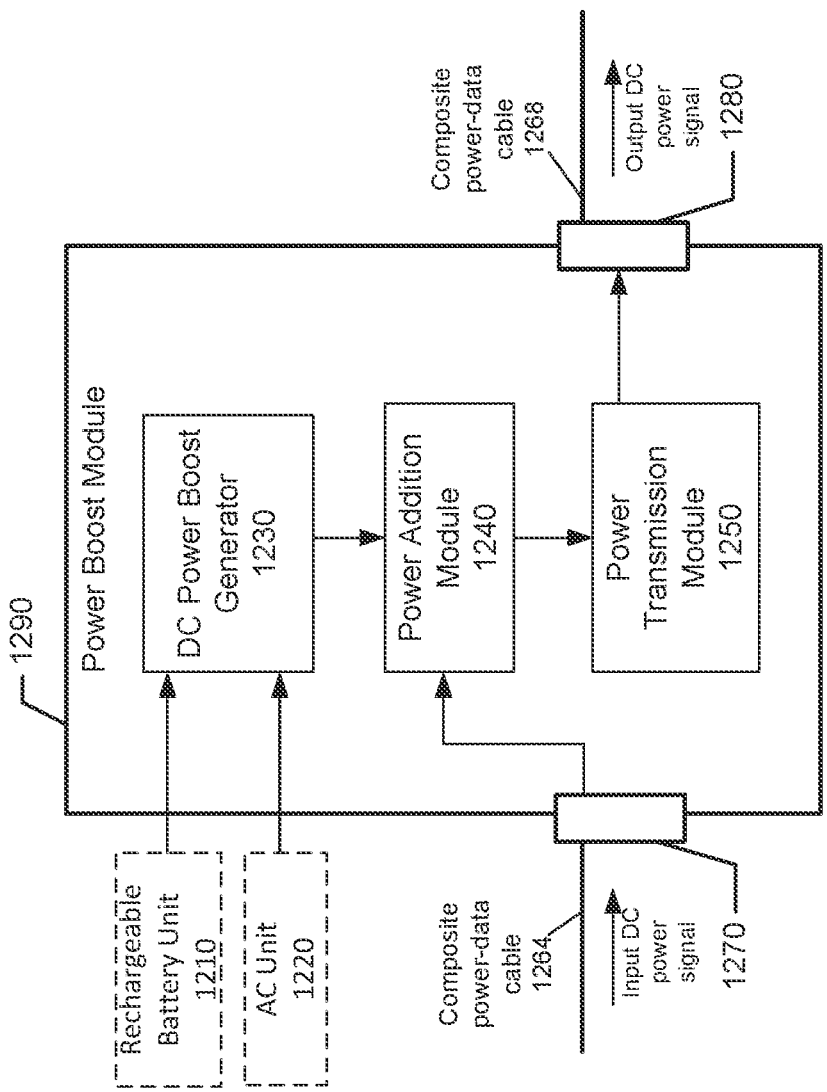
FIG. 12 is a schematic diagram illustrating a power boost module according to embodiments of the present invention.

FIG. 12 is a schematic diagram illustrating a power boost module, such as power boost module 990 of FIG. 9, according to embodiments of the present invention. Referring to FIG. 12, power boost module 1290 receives a DC power signal from a composite power-data cable 1264 at power input port 1270. The power boost module 1290 may be DC powered by a rechargeable battery unit 1210 or may be AC powered by an AC power unit 1220. Rechargeable battery unit 1210 and/or AC power unit 1220 may be co-located with power boost module 1290 or may be external to the power boost module 1290. The rechargeable battery unit 1210 may be charged during periods of lower power usage in the power and data connectivity micro grid 900 using DC power supplied by the micro grid. The AC power unit 1220 may receive an AC power signal and convert the AC power signal to the DC boost power signal. A DC power boost generator 1230 may use either the rechargeable battery unit 1210 or the AC power unit 1220 to generate a DC boost power signal that may be added to power signals received by the power boost module 1290. Although FIG. 12 illustrates that the power boost module 1290 may be powered by a rechargeable battery unit 1210 or by an AC power unit 1220, other forms of energy generation and storage may be used, such as fuel cells, generators, solar power, wind power, etc. Power addition module 1240 may add the DC boost power signal that is generated by DC power boost generator 1230 to the input DC power signal that is received at power input port 1270. The power transmission module 1250 may transmit the boosted power signal from power output port 1280 onto composite power data cable 1268. The output DC voltage of the output DC power signal at the power output port 1280 is greater than an input DC voltage of the input DC power signal received at the power input port 1270.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Well-known functions or constructions may not be described in detail for brevity and/or clarity. As used herein the expression "and/or" includes any and all combinations of one or more of the associated listed items.

It will be understood that features illustrated with one example embodiment above can be incorporated into any of the other example embodiments. Thus, it will be appreciated that the disclosed embodiments may be combined in any way to provide many additional embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A method of boosting power in a power and data connectivity micro grid for Information and Communication Technologies (ICT) infrastructure, the method comprising:
   delivering a first direct current (DC) power signal to a power port of the power sourcing equipment device;
   transmitting the first DC power signal from the power port of the power sourcing equipment device to a power input port of a first splice enclosure on a first composite power-data cable;
   transmitting a second DC power signal from a power output port of the first splice enclosure to a power input port of a power boost module on a second composite power-data cable;
   adding a DC boost power signal to the second DC power signal received at the power input port of the power boost module to generate a third DC power signal; and
   transmitting the third DC power signal from a power output port of the power boost module to a power input port of a second splice enclosure on a third composite power-data cable,
   wherein an exit DC voltage of the first DC power signal at the power input port of the first splice enclosure is less than an entry voltage of the first DC power signal at the power port of the power sourcing equipment device.

2. The method of boosting power of claim 1, wherein the DC boost power signal added to the second DC power signal received at the power input port of the power boost module results in an entry voltage of the third DC power signal at the third composite power-data cable that is greater than the an exit DC voltage of the second DC power signal that was received at the power input port of the power boost module.

3. The method of boosting power of claim 1, wherein the DC boost power signal is generated by a rechargeable battery unit.

4. The method of boosting power of claim 3, wherein the rechargeable battery unit is charged during periods of low power usage by the power and data connectivity micro grid.

5. The method of boosting power of claim 1, further comprising:
   receiving an alternating current (AC) power signal; and
   converting the AC power signal to the DC boost power signal.

6. A power and data connectivity micro grid for Information and Communication Technologies (ICT) infrastructure, comprising:
   a power sourcing equipment device configured to deliver a first direct current (DC) power signal to a power port of the power sourcing equipment device;
   a power boost module having a power input port and a power output port, wherein the power boost module is configured to add a DC boost power signal to a second DC power signal received at the power input port of the power boost module;
   a first splice enclosure having a power input port, a power tap port, and a power output port;
   a second splice enclosure having a power input port, a power tap port, and a power output port;
   a first composite power-data cable configured to transmit the first DC power signal from the power port of the power sourcing equipment device to the power input port of the first splice enclosure;
   a second composite power-data cable configured to transmit the second DC power signal from the power output port of the first splice enclosure to the power input port of the power boost module; and
   a third composite power-data cable configured to transmit a third DC power signal from the power output port of the power boost module to the power input port of the second splice enclosure,
   wherein the third DC power signal from the power output port of the power boost module comprises the DC boost power signal added to the second DC power signal that was received at the power input port of the power boost module, and
   wherein an exit DC voltage of the first DC power signal from the first composite power-data cable at the power input port of the first splice enclosure is less than an entry voltage of the first DC power signal into the first composite power-data cable at the power port of the power sourcing equipment device.

7. The power and data connectivity micro grid of claim 6, wherein the DC boost power signal added to the second DC power signal received at the power input port of the power boost module results in an entry voltage of the third DC power signal at the third composite power-data cable that is greater than the an exit DC voltage of the second DC power signal that was received at the power input port of the power boost module.

8. The power and data connectivity micro grid of claim 6, wherein the power boost module comprises a rechargeable battery unit that is configured to generate the DC boost power signal.

9. The power and data connectivity micro grid of claim 8, wherein the rechargeable battery unit is charged during periods of low power usage by the power and data connectivity micro grid.

10. The power and data connectivity micro grid of claim 6, wherein the power boost module comprises an alternating current (AC) unit that is configured to convert AC power to the DC boost power signal.

* * * * *